United States Patent [19]

Kohmoto et al.

[11] Patent Number: 5,450,242
[45] Date of Patent: Sep. 12, 1995

[54] ZOOM LENS BARREL

[75] Inventors: Shinsuke Kohmoto; Tomoaki Kobayashi, both of Tokyo, Japan

[73] Assignee: Asahi Kogaku Kogyo Kabushiki Kaisha, Tokyo, Japan

[21] Appl. No.: 26,192

[22] Filed: Feb. 26, 1993

Related U.S. Application Data

[63] Continuation of Ser. No. 500,011, Mar. 27, 1990, abandoned.

[30] Foreign Application Priority Data

| Mar. 31, 1989 | [JP] | Japan | 1-37878 |
| Mar. 31, 1989 | [JP] | Japan | 1-81255 |
| Mar. 31, 1989 | [JP] | Japan | 1-81256 |

[51] Int. Cl.⁶ .................................... G02B 15/14
[52] U.S. Cl. ............................ 359/676; 359/689; 359/695; 359/700; 359/704; 354/195.12
[58] Field of Search ............... 350/423, 427, 428–430; 354/195.11, 195.1, 195.12, 403; 359/676, 677, 683–685, 689, 690, 694–696, 699, 700, 701, 704, 705, 702–703

[56] References Cited

U.S. PATENT DOCUMENTS

| Re. 34,453 | 11/1993 | Kamitani et al. | 354/195.1 |
| 3,918,076 | 11/1975 | Shono . | |
| 3,978,503 | 8/1976 | Shono . | |
| 4,051,502 | 9/1977 | Mielke . | |
| 4,086,604 | 4/1978 | Douglas . | |
| 4,132,463 | 1/1979 | Sakaguchi et al. | 350/430 |

(List continued on next page.)

FOREIGN PATENT DOCUMENTS

| 0053922 | 6/1982 | European Pat. Off. . |
| 2373804 | 7/1978 | France . |
| 2645282 | 10/1990 | France . |

(List continued on next page.)

OTHER PUBLICATIONS

The *Yearbook for Optics and Fine Mechanics*, 1972, pp. 33–37.
United Kingdom Search Report.

*Primary Examiner*—Paul M. Dzierzynski
*Assistant Examiner*—James Phan
*Attorney, Agent, or Firm*—Sandler, Greenblum & Bernstein

[57] ABSTRACT

A zoom lens assembly includes a stationary lens barrel and a rotatable cam ring which is supported on the stationary lens barrel for movement in the direction of the optical axis while being rotated, and which includes at least two cam grooves. The zoom lens include first and third lens groups which are both movable by one of the two cam grooves in the direction of the optical axis. A second lens group movable, by a second of the two cam grooves in the direction of the optical axis is also provided, as well as a focusing mechanism, for moving the second lens group to a position which is determined by focal length data derived from actual positions of the first, second, and third lens groups and object distance data detected by an object distance measuring device. A method of controlling focusing of the zoom lens includes correcting an amount of deviation from focus caused by a zooming operation, by moving the focusing lens group. The method includes setting a reference object distance, at which no deviation from focus occurs during zooming of the zoom lens, at a finite object distance, such that the amount of movement of the focusing lens group necessary to effect focusing is determined based upon a reference position corresponding to a position of the focusing lens group at the reference object distance, in accordance with focal length data and object distance data.

11 Claims, 9 Drawing Sheets

U.S. PATENT DOCUMENTS

| | | | |
|---|---|---|---|
| 4,161,756 | 7/1979 | Thomas | 358/225 |
| 4,171,897 | 10/1979 | Fujita et al. | |
| 4,324,457 | 4/1982 | Tomori | 350/430 |
| 4,333,712 | 6/1982 | Tomori | 350/430 |
| 4,387,968 | 6/1983 | Sekiguchi | 350/429 |
| 4,410,253 | 10/1983 | Tsuboi | 354/195 |
| 4,445,756 | 5/1984 | Komoto | 350/429 |
| 4,445,762 | 5/1984 | Boccuti | |
| 4,448,496 | 5/1984 | Isobe et al. | 359/705 |
| 4,523,815 | 6/1985 | Tomori | 350/430 |
| 4,576,446 | 3/1986 | Kamata | |
| 4,621,906 | 11/1986 | Hashimoto et al. | 359/694 |
| 4,627,691 | 12/1986 | Tomori | |
| 4,696,559 | 9/1987 | Kondo | |
| 4,697,891 | 10/1987 | Kawai | 359/694 |
| 4,721,972 | 1/1988 | Wakabayashi | 354/195.1 |
| 4,752,796 | 6/1988 | Tsukahara et al. | 354/187 |
| 4,779,964 | 10/1988 | Ozawa et al. | 359/690 |
| 4,786,153 | 11/1988 | Ogata | 359/693 |
| 4,797,700 | 1/1989 | Tsuji et al. | |
| 4,806,961 | 2/1989 | Kamitani et al. | 354/195.1 |
| 4,822,153 | 4/1989 | Tomori et al. | 359/694 |
| 4,842,385 | 6/1989 | Tanaka | 359/683 |
| 4,848,884 | 7/1989 | Enomoto | 359/705 |
| 4,854,682 | 8/1989 | Yamanashi | 359/689 |
| 4,876,563 | 10/1989 | Ishida et al. | |
| 4,884,091 | 11/1989 | Nakagomi | |
| 4,890,133 | 12/1989 | Ogawa et al. | 354/402 |
| 4,910,544 | 3/1990 | Nomura | |
| 4,944,030 | 7/1990 | Haraguchi et al. | |
| 4,950,054 | 8/1990 | Wada et al. | 354/400 |
| 4,974,949 | 12/1990 | Tanaka | 359/704 |
| 4,976,523 | 12/1990 | Ishikawa | 359/696 |
| 4,978,204 | 12/1990 | Ito | |
| 4,989,027 | 1/1991 | Iishi et al. | |
| 5,014,077 | 5/1991 | Yomogizawa et al. | 354/195.12 |
| 5,033,819 | 7/1991 | Tanaka | |
| 5,040,017 | 8/1991 | Arai | |
| 5,043,752 | 8/1991 | Kohmoto | 359/701 |
| 5,065,172 | 11/1990 | Ogawa et al. | |
| 5,066,968 | 11/1991 | Suzuki et al. | 354/400 |
| 5,130,730 | 7/1992 | Ishii et al. | |
| 5,136,315 | 8/1992 | Nomura | |
| 5,144,493 | 9/1992 | Nomura | |
| 5,159,372 | 10/1992 | Nomura et al. | |
| 5,170,294 | 12/1992 | Haraguchi et al. | 359/697 |

FOREIGN PATENT DOCUMENTS

| | | |
|---|---|---|
| 1914930 | 9/1963 | Germany . |
| 3018481 | 11/1980 | Germany . |
| 3026215 | 1/1981 | Germany . |
| 3220265 | 1/1983 | Germany . |
| 3531983 | 3/1986 | Germany . |
| 3638255 | 5/1987 | Germany . |
| 3809611 | 10/1988 | Germany . |
| 57-167016 | 10/1983 | Japan . |
| 606914 | 1/1985 | Japan . |
| 62-237416 | 10/1987 | Japan . |
| 62-244026 | 10/1987 | Japan . |
| 63-26832 | 2/1988 | Japan . |
| 63-239430 | 10/1988 | Japan . |
| 01171430 | 12/1989 | Japan . |
| 1391292 | 4/1975 | United Kingdom . |
| 1466369 | 3/1977 | United Kingdom . |
| 1523135 | 8/1978 | United Kingdom . |
| 2039067 | 7/1980 | United Kingdom . |
| 2054878 | 2/1981 | United Kingdom . |
| 2112957 | 7/1983 | United Kingdom . |
| 2164470 | 3/1986 | United Kingdom . |
| 2202955 | 10/1988 | United Kingdom . |
| 2223862 | 4/1990 | United Kingdom . |
| 2230354 | 10/1990 | United Kingdom . |
| 2229010 | 12/1990 | United Kingdom . |
| 8707038 | 11/1987 | WIPO . |

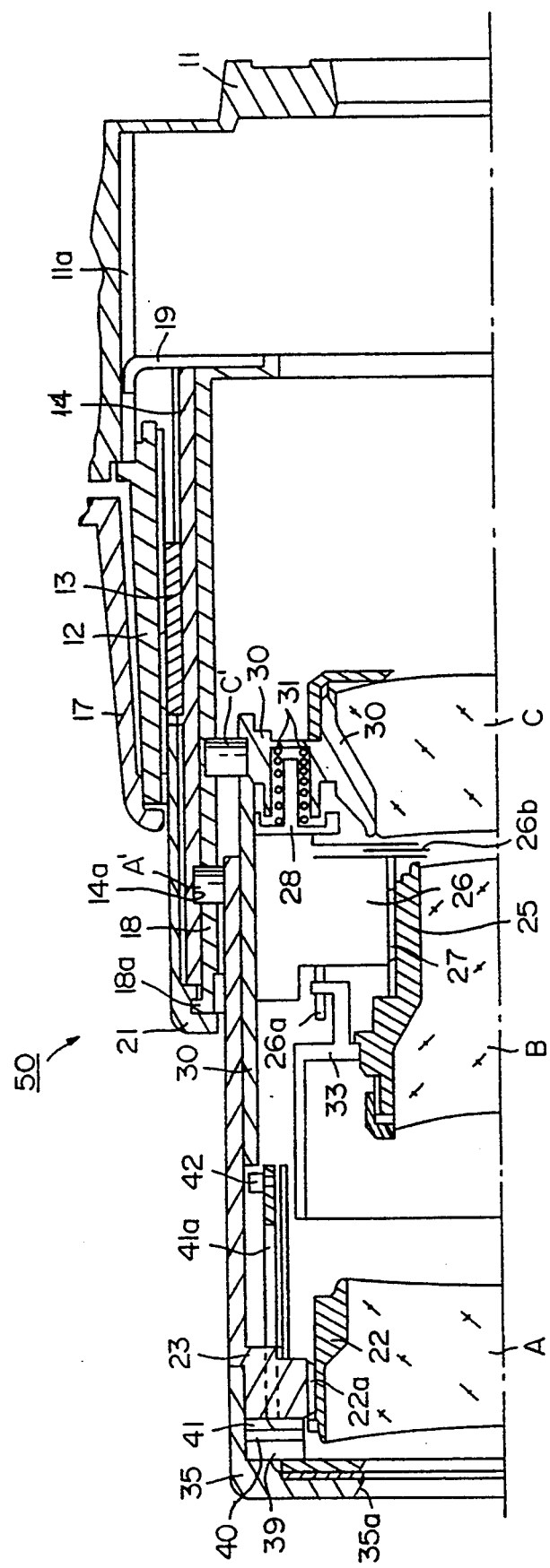

ZOOM LENS BARREL

This application is a continuation, of application Ser. No. 07/500,011, filed Mar. 27, 1990, now abandoned.

BACKGROUND OF THE INVENTION

1. Field of the Invention

The present invention relates to a zoom lens barrel which can be advantageously used with a compact camera having a photographing optical system and a separate finder optical system.

2. Description of Related Art

In a recent zoom compact camera, a zoom lens can be retracted beyond a photographing position in which a picture can be taken to reduce the storage length of the zoom lens. In this compact camera, in case where separate tracks can be provided for respective lens groups of the zoom lens, return tracks thereof can be optionally set. However, in case of a zoom lens camera having more than two lens groups of which two or more lens groups move together, there is a limit to the storage length of the zoom lens.

A zoom lens having more than two groups of lenses is known as a so-called vari-focal lens. The vari-focal lens has an advantage that it is easy to active a high variable power. However, a vari-focal lens is usually not used it a single-lens reflex camera, since a shift of focus (a change of focus point) occurs during zooming. On the contrary, in an auto-focus compact camera which has a separate photographing optical system and a finder optical system, the shift of focus which takes place during zooming can be compensated for by the displacement of the focusing lens group. Namely, since the focus position of the focusing lens group on which a focused image of an object to be taken can be formed on a film plane can be calculated in advance in accordance with the focal length and the object distance, it is possible to move the focusing lens group to the the calculated position to compensate for the shift of focus. Accordingly, in a compact camera, the vari-focal lens can be used as a zoom lens. Note that although a lens in which no shift of focus takes place during zooming is usually called a zoom lens, and a lens in which the shift of focus takes place during zooming is usually called a vari-focal lens, both lenses will be referred to as a "zoom lens" in the present specification.

In a vari-focal lens having three lens groups, the focusing is effected by a second lens group which is located between a first lens group and a third lens group. Generally speaking, in a zoom lens, upon assembly, the focusing lens group is moved in the optical axis direction to effect a zooming adjustment. The zooming adjustment is an adjustment in which no shift of focus occurs when the zooming is effected at a reference object distance (usually, the infinite distance). However, in a vari-focal lens having three lens groups, it is very difficult to perform the zooming adjustment by the second lens group which is located between the first and third lens groups.

SUMMARY OF THE INVENTION

The primary object of the present invention is to provide a zoom lens barrel which has more than two lens groups, of which two lens groups move together within a zooming range, and to decrease the accommodation length of the zoom lens.

Another object of the present invention is to provide a barrier mechanism which controls a barrier to open and close a photographing aperture, with the help of means for decreasing the accommodation length of the zoom lens.

Still another object of the present invention is to provide a zoom lens barrel in which the zooming adjustment can be easily effected, in a vari-focal zoom lens having three lens groups, of which a second lens group between a first lens group and a third lens group performs the focusing.

To achieve the object mentioned above, according to the present invention, there is provided a zoom lens barrel having at least three lens groups and a cam ring which has a zooming section and a lens accommodation section and which rotates to control the position of the lens groups. At least two lens groups of the at least three lens groups are capable of moving together in the zooming section. Means are also provided for releasing the integral movement of the at least two lens groups which are capable of moving together in the zooming section and in the lens accommodation section, so that the front lens group can be independently moved to come close to the rear lens group.

According to another aspect of the present invention, there is provided a barrier mechanism which opens and closes the photographing opening of a zoom lens barrel and which is actuated by the movement of the front lens group and the rear lens group to come close to each other.

The inventors of the present invention have also found that the zooming adjustment can be effected by the first lens group other than the focusing lens group, i.e. the second lens group. Accordingly, in still another aspect of the present invention, the first lens group is provided with a zooming adjustment mechanism, i.e. an adjustment mechanism of the axial position thereof.

BRIEF DESCRIPTION OF THE DRAWINGS

The invention will be described below in detail with reference to the accompanying drawings, in which:

FIGS. 1A, 1B and 1C are longitudinal sectional views of an upper half of a zoom lens according to the present invention, shown in an accommodated position, a shortest focal length position and a longest focal length position, respectively;

DESCRIPTION OF PREFERRED EMBODIMENTS

The following embodiments are directed to a vari-focal zoom lens having three lens groups.

Figure 6:
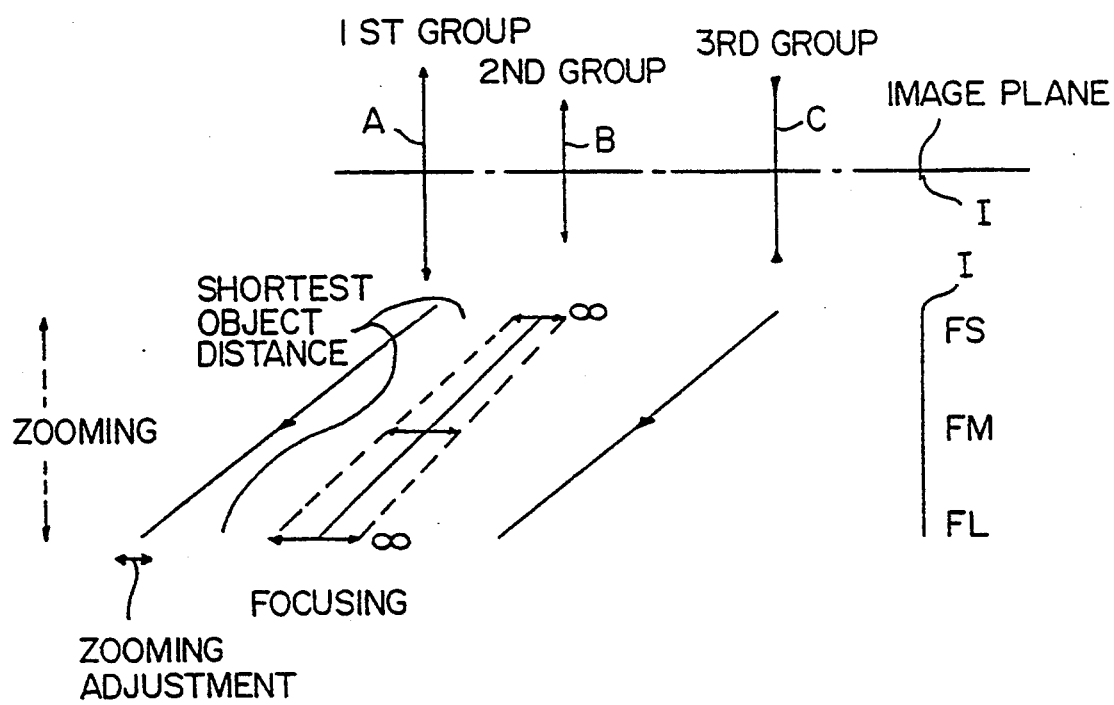
FIG. 6 is a schematic view of an optical track showing a principle of a vari-focal zoom lens and a zooming adjustment according to the present invention.

First, with reference to FIG. 6, the optical construction of such a vari-focal zoom lens and zooming and focusing functions thereof will be described below.

The vari-focal zoom lens has three lens groups first lens group A, second lens group B and third lens group C. In the illustrated embodiment, the first and second lens groups consist of positive lenses and the third lens group consists of a negative lens.

When the first and second lens groups A and B move away from an image plane I and when the spatial distance therebetween is varied, the focal length is changed from a shortest focus fS to an intermediate focus fM, and further to a longest focus fL. When the second lens group B is moved at the respective focuses, the focusing is effected. The third lens group C mainly varies the power (magnification) and can be formed integral with the first lens group A.

Upon zooming, the shift of focus in the vari-focal zoom lens mentioned above occurs, so that the focusing lens group (second lens group B) is moved and controlled to compensate for the change of the focus. Namely, the focusing lens group B is moved so as to compensate for the shift of focus at each object distance and at each focal length.

Figure 1A:
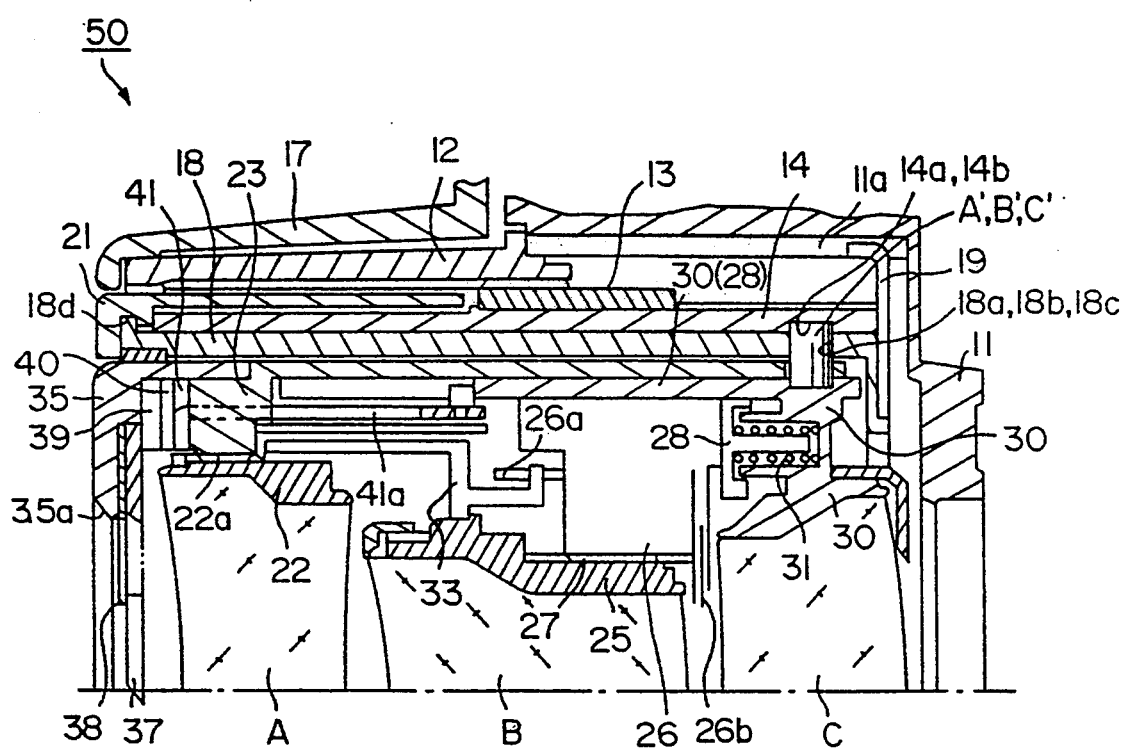
Figure 1B:
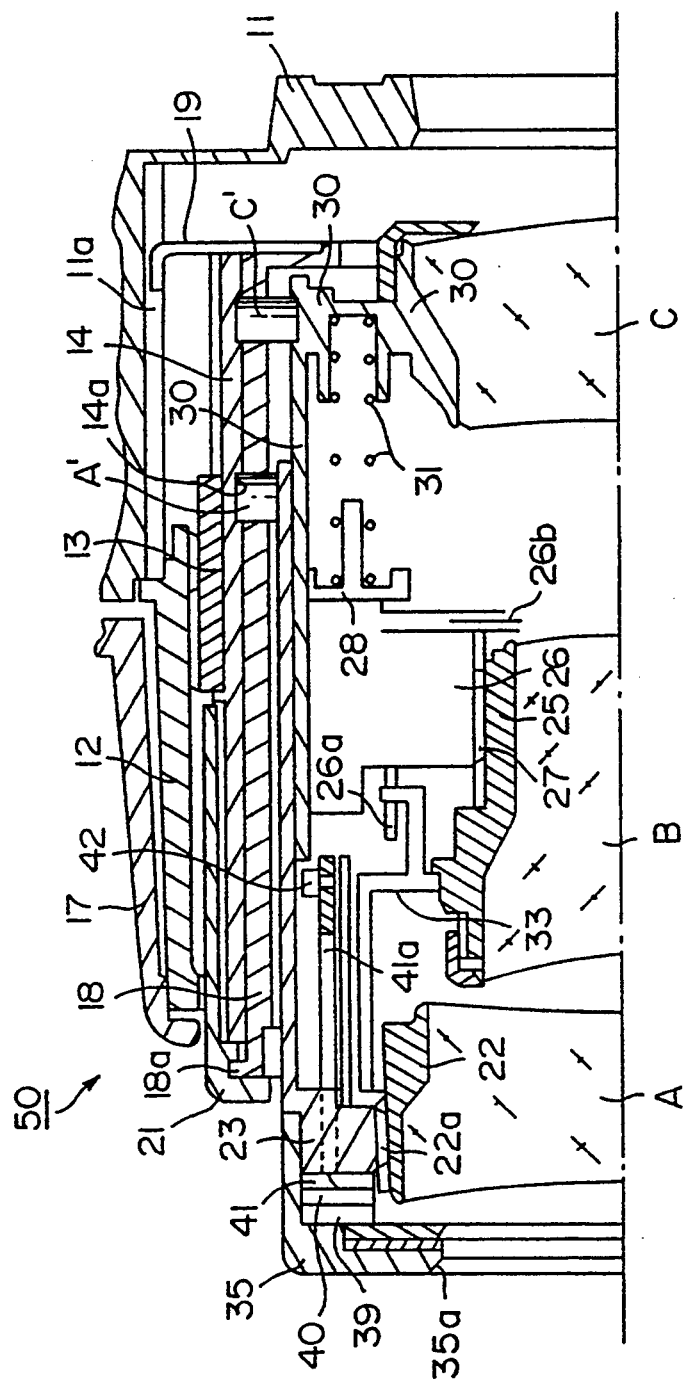
Figure 2:
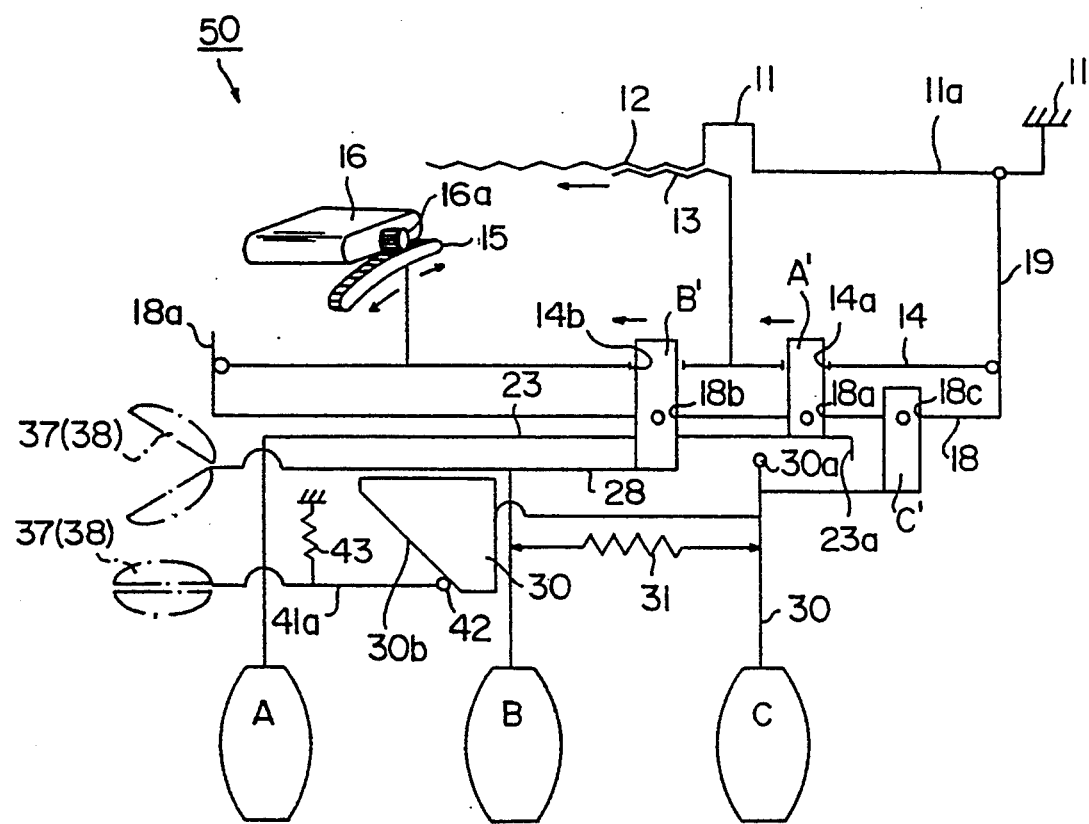
FIG. 2 is a schematic diagram of a zoom lens shown in FIGS. 1A~1C.

FIGS. 1A through 1C show a zoom lens having a vari-focal lens according to the present invention. FIG. 1A shows an accommodation (retracted) position, FIG. 1B a shortest focus (WIDE) position, and FIG. 1C a longest focus (TELE) position. FIG. 2 is a skeleton view showing a basic construction of a zoom lens barrel.

The following is the movement of the lens groups A, B and C in accordance with the present invention.

The first lens group A and the third lens group C move together in the photographing range in which a picture can be taken, between the WIDE extremity shown in FIG. 1B and the TELE extremity shown in FIG. 1C. The second lens group B moves relative to the first and third lens groups A and C to vary the spatial distance between the second lens group and the first lens group and between the second lens group and the third lens group to effect the zooming. The focusing is effected by the second lens group B. Upon a further rearward movement (retraction) of the first, second and third lens groups beyond the WIDE extremity shown in FIG. 1B toward the accommodation position shown in FIG. 1A, the first lens group A is made independent (released) from the third lens group C, so that the first lens group A and the second lens group B can be moved to come close to the third lens group C in order to minimize the accommodation or storage length.

A stationary ring 11 secured to a camera body has an outer helicoid 12 (inner peripheral surface helicoid) secured thereto. The outer helicoid 12 is engaged by an inner helicoid (outer peripheral surface helicoid) 13 which is secured to a cam ring 14. The cam ring 14 has a gear 15 secured thereto, which is engaged by a pinion 16a of a zoom motor 16, as schematically shown in FIG. 2. Consequently, when the zoom motor 16 is driven, the cam ring 14 is axially moved in the optical axis direction, in accordance with the lead of the inner helicoid 13. Preferably, the teeth of the gear 15 are inclined in the same direction as those of the inner helicoid 13. A front cover 17 covers the outer portion of the outer helicoid 12.

A linear movement ring 18 is fitted in the inner periphery of the cam ring 14. The linear movement ring 18 has a linear movement guide plate 19 secured to the rear end thereof. The linear movement guide plate 19 is partially engaged at the outer periphery thereof in a linear movement guide groove 11a formed in the stationary ring 11. An outer flange 18d is formed on the front end of the linear movement ring 18, so that the cam ring 14 is rotatably held between the outer flange 18d and the linear movement guide plate 19 so as not to move in the optical axis direction. Namely, the rotation of the linear movement ring 18 which can move together with the cam ring 14 in the optical axis direction is prevented by the linear movement guide plate 19. The cam ring 14 can rotate relative to the linear movement ring 18. A lens cover 21 is secured to the outer flange 18d.

A first lens frame 22 which supports the first lens group A is secured to a first lens moving ring 23 by an adjusting screw 22a. The adjusting screw 22a is adapted to effect the zooming adjustment upon assembly, in which no shift of focus occurs during zooming at a predetermined reference object distance. According to the present invention, the zooming adjustment can be performed by the first lens group A other than the focusing lens group, i.e. the second lens group B as shown by a solid line in FIG. 6. Since the first lens group A is located frontmost, the zooming adjustment by the first lens group A is simpler and preciser than the zooming adjustment by the second lens group B.

Figure 3:
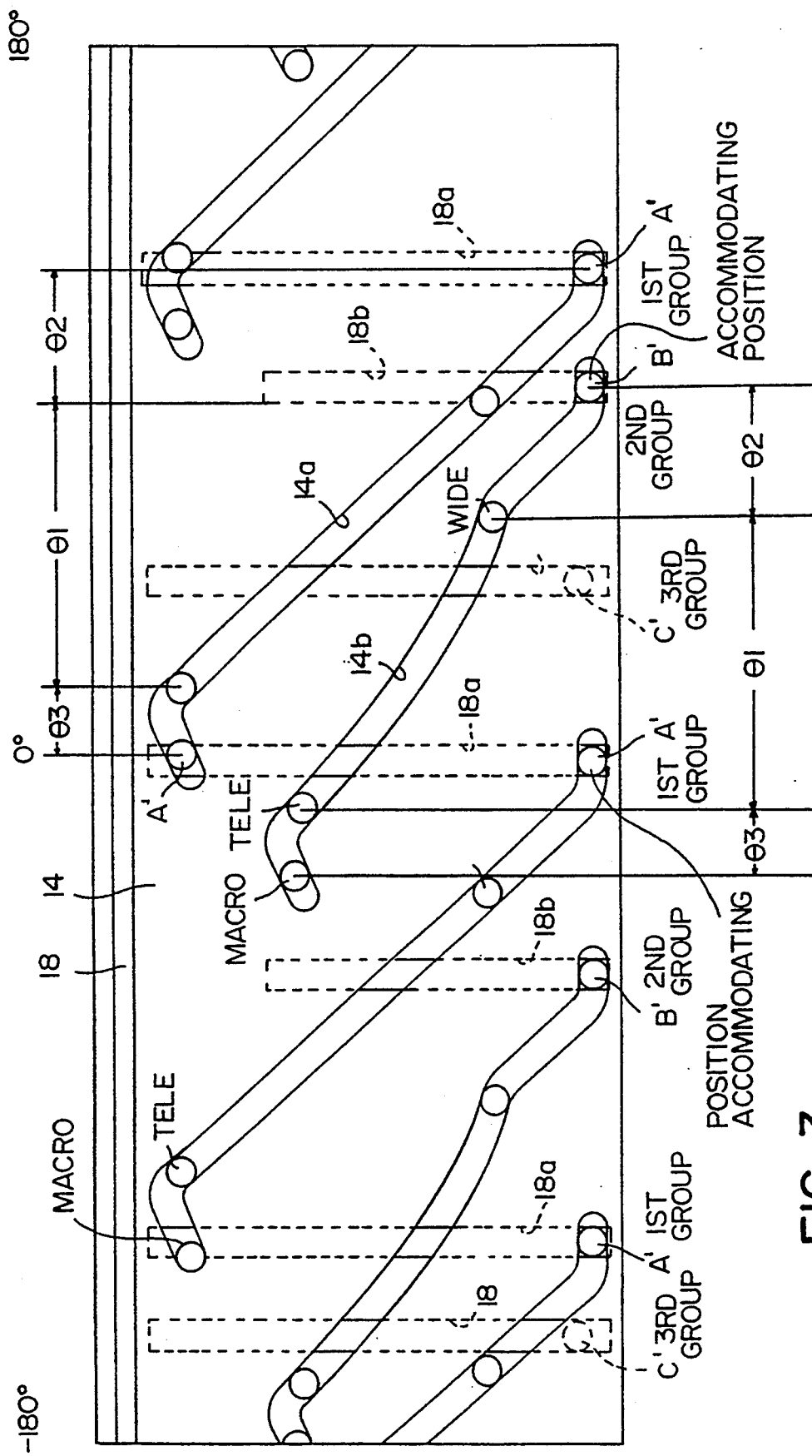
FIG. 3 is a developed view showing a relationship between cam grooves of a cam ring, linear movement guide grooves of a linear movement ring, and rollers of first, second and third lens groups.

The first lens moving ring 23 is provided on its rear portion with first group rollers A' which extend through corresponding linear movement guide grooves 18a (FIG. 3) formed in the linear movement ring 18 and is fitted in first group cam grooves 14a of the cam ring 14.

A second lens frame 25 which supports the second lens group B is screw-engaged by an inner peripheral helicoid 27 of a shutter unit 26. The shutter unit 26 is secured to a second lens moving ring 28 which is provided on its rear portion with second group rollers B'. The second group rollers B' extend through corresponding linear movement guide grooves 18b (FIG. 3) formed in the linear movement ring 18 and is fitted in second group cam grooves 14b of the cam ring 14.

Third group rollers C' are directly provided on a third lens frame 30 which supports the third lens group C. The third group rollers C' are fitted in corresponding linear movement guide grooves 18c of the linear movement ring 18. Unlike the first group rollers A' and the second group rollers B', the third group rollers C' are not fitted in the cam grooves.

Each of the first group cam grooves 14a and the second group cam grooves 14b has a zooming section $\theta1$, an accommodation section $\theta2$ before the zooming section $\theta1$, and a macro transferring section $\theta3$ after the zooming section $\theta1$. The accommodation sections $\theta2$ are for additional retraction (rearward movement) of the first, second and third lens groups A, B and C beyond the WIDE extremity. The macro transferring sections $\theta3$ are for a slight forward movement of the first, second and third lens groups A, B and C from the TELE extremity to bring the lens groups in a macro photographing position. The reasons that the inclination of the first group cam grooves 14a and the second group cam grooves 14b is small, and that the inclination of the first group cam grooves 14a is opposite to that of the second group cam grooves 14b in the macro transferring section θ3 are that the cam ring 14 itself is moved forward by the outer helicoid 12 (and the inner helicoid 13). Namely, the displacement of the first lens group A (and the third lens group C) and the displacement of the second lens group B are determined by a resultant inclination of the lead of the outer helicoid 12 and the inclination of the first and second group cam grooves 14a and 14b.

Figure 4:
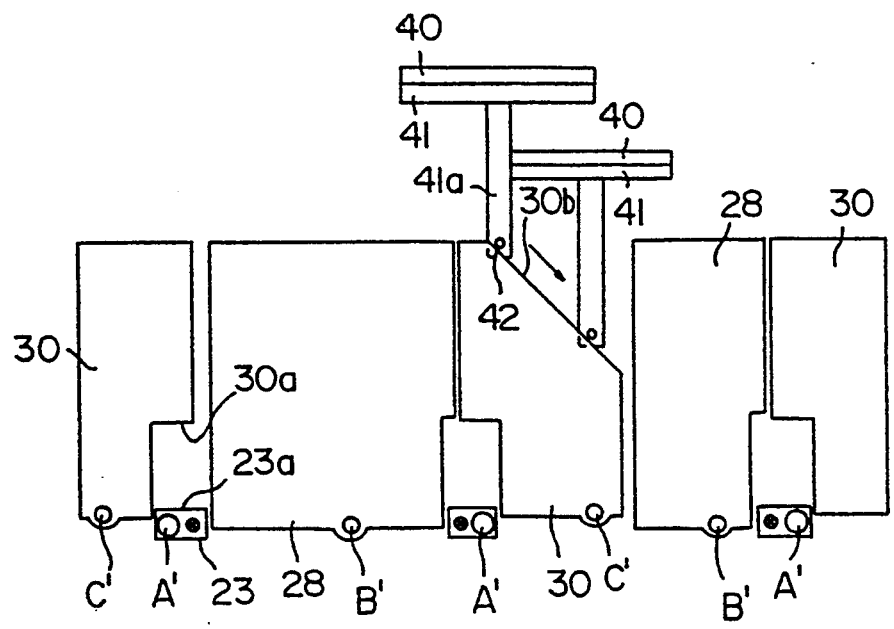
FIG. 4 is a developed view showing a positional relationship between a third lens frame and a second lens moving ring.

Between the third lens frame 30 and the first lens moving ring 23 are provided engaging portions 30a and 23a (FIGS. 2 and 4) which engage with each other while the first lens moving cam groove 23 moves from the accommodation position shown in FIG. 1A to the WIDE extremity shown in FIG. 1B in accordance with the accommodation section θ2 of the first group cam grooves 14a. Namely, when the cam ring 14 rotates, the first lens moving ring 23 moves in the optical axis direction in accordance with the engagement of the first group rollers A' and the first cam grooves 14a. However, the engaging portions 30a and 23a are always brought into contact with each other when the first group rollers A' are in the zooming sections θ1 and the macro transferring section θ3 of the first group cam grooves 14a. Accordingly, the first lens moving ring 23 (first lens group A) and the third lens frame 30 (third lens group C) move together. On the other hand, when the first group rollers A' enter the accommodation sections θ2 of the first group cam grooves 14a, the third group rollers C' come into abutment with the rear ends of the linear movement guide grooves 18c, so that the third lens frame 30 stops. In this state, the engaging portion 23a is disengaged from the engaging portion 30a to move independently. The second lens group B' is moved rearwardly in accordance with the engagement of the second group rollers B' and the second cam grooves 14b, so that the first, second and third lens groups A, B and C are moved rearwardly as a whole to shorten the accommodation length.

Between the second lens moving ring 28 and the third lens frame 30 are provided compression springs 31 which are located at a predetermined angular distance in the circumferential direction to continuously bias the third lens frame 30 rearwardly to bring the engaging portion 30a into engagement with the engaging portion 23a of the first lens moving ring 23.

As is well known, the shutter unit 26 rotates a drive pin 26a by an angle corresponding to an object distance detected by an object distance measuring device. The drive pin 26a is associated with a connection ring 33 secured to the second lens frame 25, so that when the drive pin 26a rotates, the second lens group B moves in the optical axis direction with rotation in accordance with the inner peripheral helicoid 27. The connection ring 33 is secured to the second lens frame 25 after the adjustment (focus adjustment) of the second lens frame 25 in the optical axis direction is finished. The shutter unit 26 opens and closes shutter blades 26b in accordance with the luminance of an object to be taken detected by a light measuring device.

Figure 7:
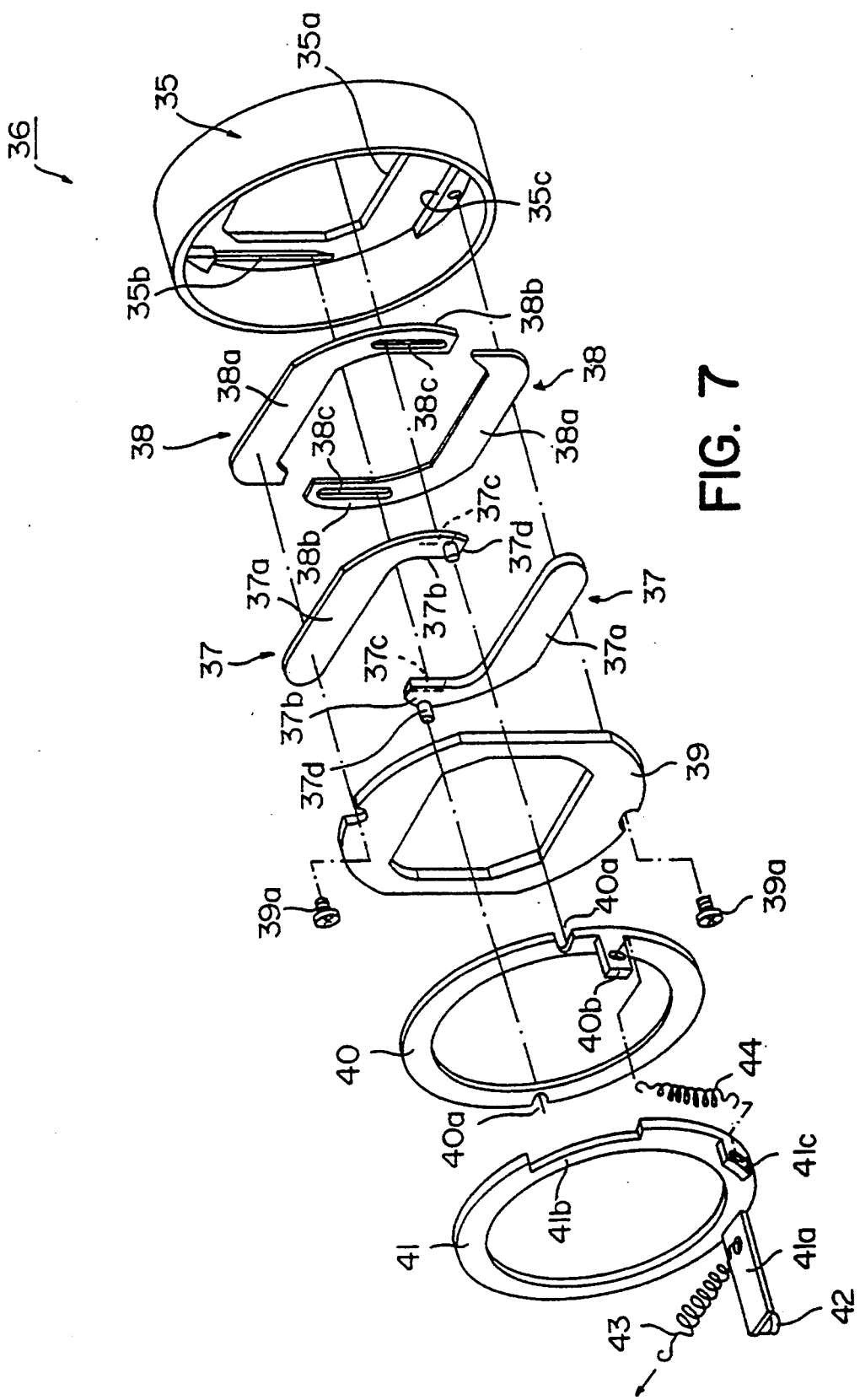
FIG. 7 is an exploded perspective view of a barrier mechanism provided on a zoom lens barrel shown in FIGS. 1A~1C; and, FIGS. 8A and 8B are back views of a barrier shown in an open position and a closed position, respectively.

To the front end of the first lens moving ring 23 is secured a decorative frame 35 having a photographing opening (aperture) 35a which is substantially rectangular in shape. A barrier mechanism 36 which opens and closes the photographing aperture 35a of the decorative frame 35 is located between the decorative frame 35 and the first lens moving ring 23. The barrier mechanism 36 is shown in detail in FIGS. 7, 8A and 8B.

On the back side of the decorative frame 35 are formed a pair of slide movement restriction grooves 35b which extend in parallel with the short side of the photographing opening 35a. The decorative frame 35 has at its back side, stepped portions (projections) 35c which restrict the movement of first and second barrier plates 37 and 38 which are received in the decorative frame 35, together with the slide movement restricting grooves 35b.

Each of the first and second barrier plates 37 and 38 have a pair of plate elements, each having an opening and closing portion 37a or 38a which extends substantially in parallel with the long side of the substantially rectangular photographing opening 35a and drive guide portion 37b or 38b which is connected to the opening and closing portion 37a or 38a and which extend substantially in parallel with the short side of the photographing opening 35a. The drive guide portions 37b or 38b of each pair of barrier plates 37 or 38 extend in the opposite directions.

Figure 8A:
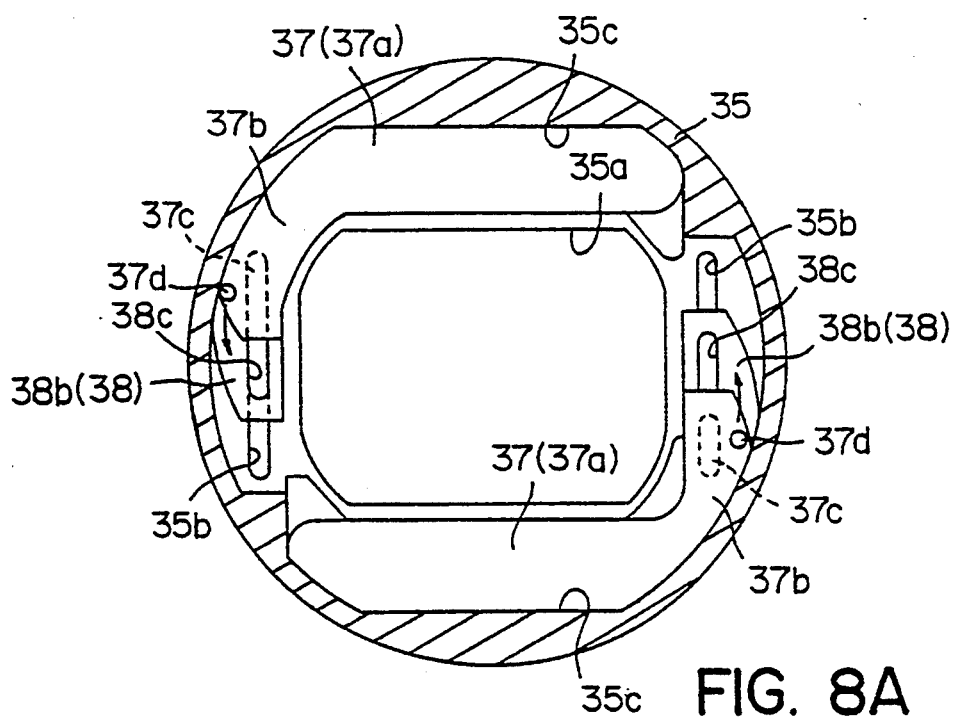

The first and second barrier plates 37 and 38 can be put one on another, so that they can be accommodated in the decorative frame 35 outside the photographing opening 35 of the decorative frame 35, as shown in FIG. 8A.

The opening and closing portions 37a of the first barrier plates 37 are provided, on their front and rear side faces, with key projections 37c and association pins 37d, respectively. The opening and closing portions 38a of the second barrier plates 38 are provided with elongated holes 38c in which the key projections 37c are fitted. The associated elongated holes 38c usually come into contact with one end of the corresponding key projections 37c and come into contact with the other ends of the corresponding key projections 37c when the first and second barrier plates 37 and 38 are aligned in which the ends thereof are partially overlapped.

The key projections 37c are fitted in the corresponding slide movement restricting grooves 35b through the elongated holes 38c. With this fitting engagement, the directions of the slide movements of the first and second barrier plates 37 and 38 are restricted. The first and second barrier plates 37 and 38 are held by and between the decorative frame 35 and a supporting plate 39 which is secured to the stepped portions 35c of the decorative frame 35 by set screws 39a.

An annular drive plate 40 and an annular rotational plate 41 are inserted in the decorative frame 35. The drive plate 40 has radial association grooves 40a which are diametrically opposed. The association pins 37 of the first barrier plates 37 are fitted in the corresponding association grooves 40a. The rotational plate 41 has a drive arm 41a integral therewith which extends in the optical axis direction. The drive arm 41a has at its rear end a roller 42 which bears against a tapered surface 30b (FIGS. 4 and 5) formed at the front end of the third lens frame 30.

The drive plate 40 has an association projection 40b which is fitted in a circumferential recess 41b of the rotational plate 41. The rotational plate 41 has a projection 41c to which one end of a tensile spring 44 is connected. The opposite end of the spring 44 is connected to the association projection 40b of the drive plate 40. The rotational plate 41 is biased by a tensile spring 43 which is provided between the drive arm 41a and a stationary portion of the lens barrel, in a direction that the barrier plates 37 and 38 close the photographing opening 35a. The rotational plate 41 and the drive plate 40 are usually rotated together by the tensile spring 44, and when the force is applied to the drive plate 40 (i.e. when a force to prevent the barrier plates 37 and 38 from rotating is applied), the tensile spring 44 is extended to permit the rotational plate 41 and the drive plate 40 to rotate relative to each other.

The tapered surface 30b of the third lens frame 30 comes into contact with the roller 42 of the rotational plate 41 when the third lens frame 30 moves together with the first lens moving ring 23 in the optical axis direction in the accommodation section θ2. The tapered surface 30b pushes the roller 42 to rotate the rotational plate 41 by the necessary angular displacement for the operation (open and close) of the barrier.

Figure 5:
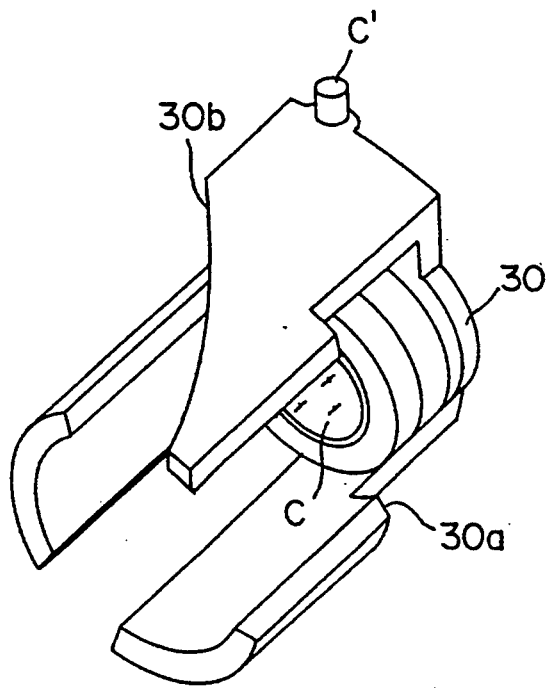
FIG. 5 is a perspective view of a third lens frame.

The force of the tensile spring 43 becomes largest and smallest when the first and second barrier plates 37 and 38 open and close the photographing aperture 35a, respectively. Namely, the spring force of the tensile spring 43 becomes gradually large when the barrier plates 37 and 38 are gradually opened. To this end, the rotational force to be applied to the rotational plate 41 is preferably gradually changed from a small value to a large value. Such a gradual change of the spring force can be achieved by the tapered surface 30b having a cam profile which causes the rotational plate 41 to rotate in such a way that an angular displacement of the rotational plate 41 for unit displacement of the third lens frame 30 decreases as the spring force increases, as shown in FIG. 5.

In the zoom lens barrel mentioned above, when the zoom motor 16 is rotated in the forward and reverse directions to rotate the cam ring 14 in the clockwise and counterclockwise directions, the cam ring 14 is moved in the optical axis direction while rotating by the engagement of the inner helicoid 13 and the stationary outer helicoid 12, so that the axial movement of the linear movement ring 18 in the same direction takes place. As a result, since the rotation of the linear movement ring 18 is restricted by the linear movement guide plate 19 and the linear movement guide groove 11a, a relative rotation takes place between the cam ring 14 and the linear movement ring 18. Consequently, the first lens group A and the second lens group B are moved in the optical axis direction in accordance with the first group cam grooves 14a and the second group cam grooves 14b.

The third lens group C stops before the first group cam grooves 14a of the cam ring 14 cause the first lens moving ring 23 to move in the accommodation section θ2 in order to engage the engaging portion 23a of the first lens moving ring 23 with the engaging portion 30a of the third lens frame 30, since the third group rollers C' are located at the rear ends of the linear movement guide grooves 18c. When the engaging portions 23a and 30a engage with each other, a further rotation of the cam ring 14 toward the zooming section θ1 causes the third lens group C to move together with the first lens group A. As a result, in the zooming section θ1, the first, second and third lens groups A, B and C move in the optical axis direction in accordance with a predetermined relationship between the first group cam grooves 14a and the second group cam grooves 14b to effect the zooming.

The above discussion can be applied to the transfer from the zooming section θ1 to the macro transferring section θ3.

On the contrary, in case of transfer from the zooming section θ1 to the accommodation section θ2, when the engaging portions 23a and 30a engage with each other, the first lens group A and the third lens group C move together. However, when the rearward movement of the third lens group C is restricted by the linear movement guide grooves 18c, only the first lens group A is moved rearwardly to come close to the third lens group C. At the same time, the second lens group B is moved rearwardly in accordance with the second group cam grooves 14b to come close to the third lens group C, thereby to shorten the lens accommodation length, as shown in FIG. 1A.

Namely, in the zoom lens barrel as constructed above, first, the lens accommodation length can be shortened by the fact that the cam ring 14 moves in the optical axis directions while rotating, that the linear movement ring 18 moves in the optical axis direction together with the cam ring 14, and that the profiles of the first group cam grooves 14a and the second group cam grooves 14b are designed so as to move the first lens group A (the third lens group C) and the second lens group B in accordance with the relative rotation of the cam ring 14 and the linear movement ring 18. Second, the lens accommodation length can be shortened also by the break of the integral connection of the first lens group A and the third lens group C upon entry into the accommodation portion of the zoom lens barrel, so that both the first lens group A and the second lens group B move to come close to the third lens group C.

The barrier mechanism 36 operates in accordance with the relative movement of the first lens group A and the second lens group B as follows.

Figure 8B:
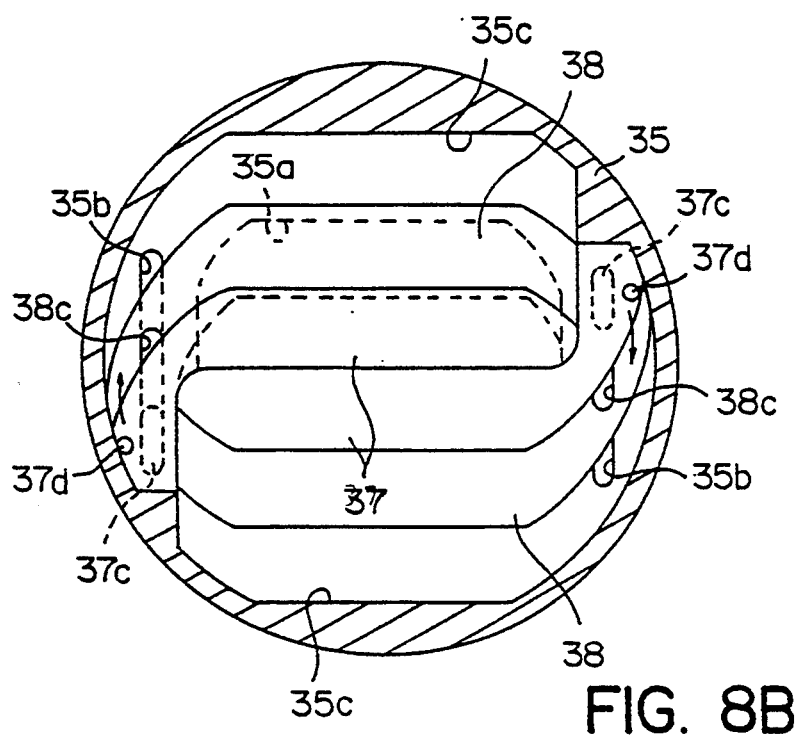

When no external force is applied to the rotational plate 41, the first and second barrier plates 37 and 38 are closed by the spring force of the tensile spring 43, as shown in FIG. 8B. When the first lens moving ring 23 is advanced in the accommodation section θ2, the engagement position of the tapered surface 30b of the third lens frame 30 which moves relative to the first lens moving ring 23 and the roller 42 of the drive arm 41b changes, so that the rotational plate 41 and the drive plate 40 are rotated against the spring force of the tensile spring 43. As a result, the association pins 37d of the barrier plates 37 are moved in the direction shown by arrows in FIG. 8B through the drive plate 40, so that a pair of barrier plates 37 move to come away from the center of the photographing opening 35a. The key projections 37c of the first barrier plates 37 move in the corresponding elongated holes 38c of the second barrier plates 38, and accordingly, the second barrier plates 38 do not move (It is assumed that no movement due to the frictional force occurs). When the first barrier plates 37 move and are superimposed on the associated second barrier plates 38, so that the key projections 37c of the first barrier plates 37 reach the ends of the association elongated holes 38c of the second barrier plates 38, the second barrier plates 38 begin moving. As a result, the first and second barrier plates 37 and 38 move together toward the retracted position (FIG. 8A) in which the barrier plates 37 and 38 are located outside the photographing opening 35a. Thus, the photographing opening 35 is opened.

At the retracted position in which the first barrier plates 37 and the second barrier plates 38 open the photographing opening 35a, when the third lens frame 30 moves relative to the first lens moving ring 23 from the accommodation section θ2, the cam surface (tapered surface) 30b causes the rotational plate 41 to rotate against the tensile spring 43. Consequently, the association pins 37d of the first barrier plates 37 move in the direction shown at the arrows in FIG. 8A through the drive plate 40, so that the first barrier plates 37 move toward the center of the photographing opening 35a. In the beginning stage of the movement, the key projections 37c move in the corresponding elongated holes 38c of the second barrier plates 38, so that no movement of the second barrier plates 38 takes place (It is assumed that no movement due to the frictional force occurs). When the key projections 37c reach the ends of the elongated holes 38c, the second barrier plates 38 begin moving. When the opening and closing portions 37a of the first barrier plates 37 come into abutment with each other at the center of the photographing opening 35a, the opening and closing portions 38a of the second barrier plates 38 and the opening and closing portions 37a of the first barrier plates 37 are located side by side, as shown in FIG. 8B. Namely, the spaces surrounding the opening and closing portions 37a of the first barrier plates 37 in the photographing opening 35a are closed by the opening and closing portions 38a of the second barrier plates 38. Thus, the first barrier plates 37 and the second barrier plates 38 close the photographing opening 35a (FIG. 8B).

We claim:

1. A zoom lens assembly adapted to be positioned within a camera, said assembly comprising:
    a barrel and a plurality of lens groups positioned within said barrel;
    a stationary ring encircling said barrel;
    a cam ring that is rotatably supported by said stationary ring and is rotatable about said barrel, said cam ring being adapted to guide movement of said lens groups between an accommodation position in which said lens groups are retracted into the camera and in which photographs cannot be taken, and a zooming range within which photographs can be taken, and for guiding movement of said lens groups within said zooming range;
    said cam ring including a plurality of cam grooves, each of said cam grooves having a zooming section for guiding movement of said lens groups in said zooming range, and a lens accommodation section connected to one end of said zooming section for guiding movement of said lens groups between said accommodation position and said zooming range;
    said lens groups comprising a first lens group, a second lens group and a third lens group, wherein each of said lens groups is contained within said barrel, said first lens group and said third lens group being movable in an optical axis direction of said zoom lens barrel to a predetermined axial position which is determined by at least one of said cam grooves in the zooming section, said second lens group being movable in the optical axis direction to a predetermined axial position which is determined by another of said cam grooves;
    engaging portions, provided on each of said first and third lens groups, which engage each other when said plurality of lens groups are in the zooming range, in order to move said first and third lens groups over equal distances in said zooming range, said engaging portions being disengaged from each other when said plurality of lens groups are moved between said accommodation position and said zooming range; and
    means for restricting backward movement of said third lens group in said lens accommodation section of said cam grooves, wherein said first and second lens groups will approach said third lens group when said lens groups are moved into said accommodation position.

2. A zoom lens assembly according to claim 1, wherein said restricting means comprises a linear movement ring having a linear movement guide groove to restrict the backward movement of said third lens.

3. A zoom lens assembly according to claim 2, further comprising a lens frame which supports said third lens group.

4. A zoom lens assembly according to claim 3, wherein said engaging portions of the first and third lens groups are engaged by the third lens frame when the lens groups move from the accommodation position to the zooming range, wherein the first and third lens groups are connected for integral movement with each other in said zooming range.

5. A zoom lens assembly according to claim 3, further comprising biasing means provided between said second lens group and said third lens group for biasing said third lens group rearwardly.

6. A zoom lens assembly according to claim 5, wherein said biasing means biases said engaging portion of said third lens group toward said engaging portion of said first lens group.

7. A method for adjusting focus of and accommodating a zoom lens adapted to be positioned within a camera, said zoom lens having a plurality of lens groups, including a first lens group that is the lens group closest to an object to be photographed, and a focusing lens group located rearwardly of the first lens group, the lens groups being movable between an accommodation position in which the lens groups are retracted into the camera and in which photographs cannot be taken by said camera, and a zooming range within which photographs can be taken by said camera, said method comprising:
    zooming by varying a spatial distance between the first lens group and the focusing lens group;
    focusing by moving the focusing lens group;
    moving the first lens group in an optical axis direction of the zoom lens, so that no shift of focus takes place when the zooming is effected at a predetermined reference object distance; and
    moving said first lens group and said focusing lens group relative to one another, such that the spatial distance between the first lens group and the focusing lens group effectively reduce the length of the zoom lens when the zoom lens is moved to said accommodation position from said zooming range.

8. A method for adjusting focusing of a zoom lens according to claim 7, further comprising moving a third lens group during zooming so that the distance between said first lens group and said third lens group remains constant during zooming, wherein said third lens group is located further from an object to be photographed than said focusing lens group.

9. A zoom lens barrel comprising:
    a photographing lens group;
    a lens moving mechanism for moving said photographing lens group between a photographing position, in which a picture can be taken, and an accommodation position which is rearward of said photographing position;

a frame having a photographing opening in front of said photographing lens group; and a barrier mechanism comprising a rotational plate which is rotatably supported by said frame, for opening and closing a photographing opening of the zoom lens barrel, so that when said rotational plate rotates, said barrier mechanism is actuated to open and close the photographing opening by rotational movement of said rotational plate, so as to open and close said photographing opening, said photographing lens group comprising a zoom lens having a lens barrel, at least a first lens group, a second lens group and a third lens group contained with said lens barrel, said third lens group being supported by a lens frame, said frame being integrally formed with said first lens group, said third lens group being movable relative to said first lens group when said photographing lens group moves between said photographing position and said accommodation position, said lens frame being associated with said barrier mechanism so that said barrier mechanism can be actuated to open and close said photographing opening by movement of said lens frame relative to said first lens group, wherein said rotational plate has a drive arm which extends toward said lens frame, said lens frame having a tapered surface which contacts said drive arm to rotate said drive arm, and wherein said barrier mechanism comprises first and second pairs of barrier plates which are off-set, in a direction of thickness thereof, in a symmetrical arrangement with respect to a center of said photographing opening, a first supporting mechanism linearly movably supporting said first pair of barrier plates between a closed position in which said first pair of barrier plates come into contact with each other at said center of said photographing opening and a retracted position in which said first pair of barrier plates are located outside said photographing opening, and a second supporting mechanism which linearly movably supports said second pair of barrier plates between a closed position in which said second pair of barrier plates and said first pair of barrier plates are located side by side to close said photographing opening and a retracted position in which said second pair of barrier plates are located outside said photographing opening, in association with movement of said first pair of barrier plates, said rotational plate and said first pair of barrier plates being associated with each other so that said first pair of barrier plates are linearly moved by rotation of said rotational plate.

10. A zoom lens barrel according to claim 9, wherein said barrier mechanism comprises biasing means for biasing the barrier plates in the closed position or the retracted position.

11. A zoom lens barrel according to claim 9, wherein said tapered surface of said lens frame defines a cam surface which decreases an angular displacement of said rotational plate per unit displacement of said lens frame, as a biasing force of a biasing means which depends on a position of said barrier plates increases.

* * * * *